(12) United States Patent
Lippey (10) Patent No.: US 7,995,092 B2
(45) Date of Patent: Aug. 9, 2011

(54) TWO-DIMENSIONAL AND THREE-DIMENSIONAL PROJECTING

(76) Inventor: Barret Lippey, Belmont, MA (US)

( * ) Notice: Subject to any disclaimer, the term of this patent is extended or adjusted under 35 U.S.C. 154(b) by 1495 days.

(21) Appl. No.: 11/398,401

(22) Filed: Apr. 5, 2006

(65) Prior Publication Data

US 2007/0236617 A1 Oct. 11, 2007

(51) Int. Cl.
*H04N 15/00* (2006.01)
(52) U.S. Cl. .......................................................... 348/60
(58) Field of Classification Search ...................... 348/60
See application file for complete search history.

(56) References Cited

U.S. PATENT DOCUMENTS

| | | | |
|---|---|---|---|
| 4,734,756 A * | 3/1988 | Butterfield et al. ............. 348/43 |
| 5,028,121 A | 7/1991 | Baur et al. | |
| 5,042,921 A | 8/1991 | Sato et al. | |
| 5,074,645 A | 12/1991 | Gold et al. | |
| 5,218,386 A * | 6/1993 | Levien ........................... 351/163 |
| 5,347,644 A | 9/1994 | Sedlmayr | |
| 5,537,476 A * | 7/1996 | Coteus et al. ................... 380/54 |
| 5,552,840 A | 9/1996 | Ishii et al. | |
| 5,575,548 A | 11/1996 | Lee et al. | |
| 5,982,538 A | 11/1999 | Shikama et al. | |
| 6,142,624 A | 11/2000 | Morris et al. | |
| 6,276,801 B1 | 8/2001 | Fielding | |
| 6,280,034 B1 | 8/2001 | Brennesholtz | |
| 6,283,597 B1 * | 9/2001 | Jorke ............................... 353/31 |
| 6,309,071 B1 | 10/2001 | Huang et al. | |
| 6,624,935 B2 | 9/2003 | Weissman et al. | |
| 6,650,377 B2 | 11/2003 | Robinson et al. | |
| 6,672,722 B2 | 1/2004 | O'Connor et al. | |
| 6,698,890 B1 * | 3/2004 | Jorke ................................. 353/7 |
| 6,777,070 B1 | 8/2004 | Murata et al. | |
| 6,793,341 B2 | 9/2004 | Svardal et al. | |
| 6,867,775 B2 * | 3/2005 | Buck et al. ..................... 345/427 |
| 6,945,654 B2 | 9/2005 | Newell et al. | |
| 6,972,810 B2 | 12/2005 | Magarill et al. | |
| 7,241,014 B2 | 7/2007 | Lippey et al. | |
| 2001/0028416 A1 | 10/2001 | Divelbiss et al. | |
| 2002/0021832 A1 * | 2/2002 | Dawson ........................ 382/154 |
| 2002/0154404 A1 | 10/2002 | Sedlmayr | |
| 2003/0020809 A1 | 1/2003 | Gibbon et al. | |
| 2006/0119795 A1 | 6/2006 | Lippey et al. | |
| 2007/0035707 A1 * | 2/2007 | Margulis ........................ 353/122 |
| 2007/0236809 A1 | 10/2007 | Lippey et al. | |
| 2009/0219382 A1 * | 9/2009 | Routhier et al. ................. 348/43 |

FOREIGN PATENT DOCUMENTS

| | | |
|---|---|---|
| DE | 199 24 167 A1 | 12/2000 |
| DE | 20 2005 00107 U1 | 3/2005 |
| DE | 103 59 788 A1 | 4/2005 |
| JP | 11-281931 | 10/1999 |
| WO | WO 00/23845 | 4/2000 |
| WO | 02/32149 | 4/2002 |

(Continued)

OTHER PUBLICATIONS

PCT International Search Report (EPO), Nov. 13, 2007, pp. 1-8.

(Continued)

*Primary Examiner* — James M Hannett
(74) *Attorney, Agent, or Firm* — Bose Corporation (57) ABSTRACT

A processor adjusts a first image generated by a projector and a second image generated by the projector in a first manner if the first and second images together include a stereoscopic image, and in a second manner if the first and second images do not include a stereoscopic image.

22 Claims, 8 Drawing Sheets

FOREIGN PATENT DOCUMENTS

| WO | WO 02/32149 A2 | 4/2002 |
|---|---|---|
| WO | 02/076107 | 9/2002 |
| WO | WO 02/076107 A1 | 9/2002 |
| WO | 2004/038457 | 5/2004 |
| WO | WO 2004/038457 A2 | 5/2004 |
| WO | WO 2005/039192 A | 4/2005 |
| WO | WO 2005/109091 A | 11/2005 |
| WO | WO 2006/004342 A | 1/2006 |
| WO | WO 2006/016315 A | 2/2006 |

OTHER PUBLICATIONS

Woods et al., "Ghosting in anaglyphic stereoscopic images," Proceedings of the SPIE, 5291(1):354-365, 2004. Abstract only (IEE Database Accession No. 8283259).

International Search Report and Written Opinion dated Sep. 15, 2006 from International Application No. PCT/US2005/043623.

International Preliminary Report on Patentability dated Jun. 5, 2007 from International Application No. PCT/US2005/043623.

International Search Report and Written Opinion dated Nov. 13, 2007 from International Application No. PCT/US2007/065858.

International Preliminary Report on Patentability dated Apr. 11, 2008 from International Application No. PCT/US2007/065858.

International Search Report and Written Opinion dated Feb. 22, 2008 from International Application No. PCT/US2007/065937.

Action and Response History retrieved for U.S. Appl. No. 11/002,613, through Jun. 10, 2008.

Action and Response History retrieved for U.S. Appl. No. 11/398,376, through Jul. 16, 2008.

International Preliminary Report on Patenability dated Oct. 16, 2008 for related Appl. No. PCT/US07/065937.

Jorke, et al. Infitec—A New Steroscopic Visualisation Tool by Wavelength Multiplex Imaging, www.infitec.net/infitec_english.pdf, Publication date unknown. Downloaded Sep. 20, 2005.

* cited by examiner

*Nonlinear R'G'B' mapping to linear RGB*

FIG. 6A

*Imaging device linear level encoding*

FIG. 6B

*Three step color mapping approach*

FIG. 6C

TWO-DIMENSIONAL AND THREE-DIMENSIONAL PROJECTING

BACKGROUND

This description relates to two-dimensional and three-dimensional projecting.

Stereoscopic projection, commonly called three-dimensional (3D) projecting, delivers slightly different images to each eye of a viewer, which gives the illusion of depth when the viewer's brain assembles the two images into a single scene.

In a polarization-based 3D projection system, two projectors are used, one for each eye, and polarizing filters are used to polarize the light from each projector orthogonally to the other. The viewer wears glasses with corresponding polarizing filters, so that each eye receives only light projected from the corresponding projector.

In anaglyphic projection, the two images are each color-shifted, one into the red end of the visible spectrum and one into the blue end. The viewer wears glasses with red and blue filters, one for each eye, so that each eye sees only the image shifted into the corresponding color. The viewer's brain reassembles the two images into a single reduced-color image with the illusion of depth. Such a system also works with still images, which can be printed with the two color-shifted images overlaid.

A third approach projects alternating images for each eye, and glasses, for example with LCD shutters, actively block the view of the eye opposite the image currently being projected.

SUMMARY

In general, in one aspect, a processor adjusts a first image generated by a projector and a second image generated by the projector in a first manner if the first and second images together include a stereoscopic image, and in a second manner if the first and second images do not include a stereoscopic image.

Implementations may include one or more of the following features. The first image includes light having a first set of multiple wavelength bands and the second image includes light having a second set of multiple wavelength bands, the first and second sets of multiple wavelength bands not overlapping above 20% of peak intensity. The first and second sets of multiple wavelength bands do not overlap above 5% of peak intensity. Adjusting the images includes controlling an image attribute by adjusting brightness of subsets of the first and second sets of wavelength bands. The first set of wavelength bands includes a band of wavelengths having a center wavelength around 435 nm, a band of wavelengths having a center wavelength around 510 nm, and a band of wavelengths having a center wavelength around 610 nm. The second set of wavelength bands includes a band of wavelengths having a center wavelength around 475 nm, a band of wavelengths having a center wavelength around 550 nm, and a band of wavelengths having a center wavelength around 660 nm. The image attribute includes a white point of the composite image. The image attribute includes a gamma value of the composite image. The image attribute includes a contrast value of the composite image. The image attribute includes a brightness of the composite image.

Adjusting the first and second image in the first manner includes changing brightness of the first and second images by equal amounts. Adjusting the first and second image in the second manner includes changing brightness of the first and second images by different amounts. The processor is configured to adjust the images to control an image attribute of the projected light.

In general, in one aspect, a projector includes a first image source to generate images in light having a first set of multiple wavelength bands, a second image source to generate images in light having a second set of multiple wavelength bands, a processor to adjust a first image generated by the first image source and a second image generated by the second image source in a first manner if the first and second images together include a stereoscopic image, and in a second manner if the first and second images do not include a stereoscopic image.

In general, in one aspect, light having a first set of wavelengths is directed to a first image source, light having a second set of wavelengths is directed to a second image source, and an image attribute of a composite image formed from a combination of the light from the first and second image sources is adjusted by decreasing a brightness of light having a subset of the first set of wavelengths and of light having a subset of the second set of wavelengths.

In general, in one aspect, a first series of images is generated in a first set of wavelengths and a second series of images is generated in a second set of wavelengths. If the first and second images include a stereoscopic image, the images are adjusted in a first manner, and if the first and second images do not include a stereoscopic image, the images are adjusted in a second manner.

Implementations may include one or more of the following features. Determining whether the first and second images include a stereoscopic image by receiving an input from an external source of information. The external source of information is a person. The external source of information is a source of the images. Whether the first and second images include a stereoscopic image is determined by comparing the first and second images, and determining that they include a stereoscopic image if they are different, and determining that they do not include a stereoscopic image if they are the same. The first and second image are adjusted in the first manner includes changing brightness of the first and second images by different amounts. The first and second image are adjusted in the second manner includes changing brightness of the first and second images by equal amounts.

In general, in one aspect, a first three-color-band filter and a second three-color-band filter are configured to pass color bands such that, in a projection generated by a light source having uniform intensity over a broad spectrum of light, light that is not filtered by the first and second filters, and light that is filtered by the first and second filters have white points that differ by no more than 0.005 in x and 0.005 in y. In some implementations, the light source is a Xenon lamp.

In general, in one aspect, a first color filter transmits light in a first three bands of wavelengths and reflects light in other wavelengths, a second color filter transmits light in a second three bands of wavelengths and reflects light in other wavelengths, a first reflective imaging source imparts an image to light transmitted by the first color filter and directs the light to the second color filter, a second reflective imaging source imparts an image into light reflected by the first color filter and directs the light to the second color filter, and a lens focuses light from the second color filter onto a viewing screen. In some implementations, the first and second three bands of wavelengths are the same.

Advantages include the ability to use a single projector to project both 2D and 3D images. The color point of 2D projections can be optimized independently of the color point of 3D projections. The 3D projector is easy to maintain because the two image sources are aligned internally to a single device and do not have to be realigned during use.

Other features will be apparent from the description and from the claims.

DESCRIPTION

Figure 1:
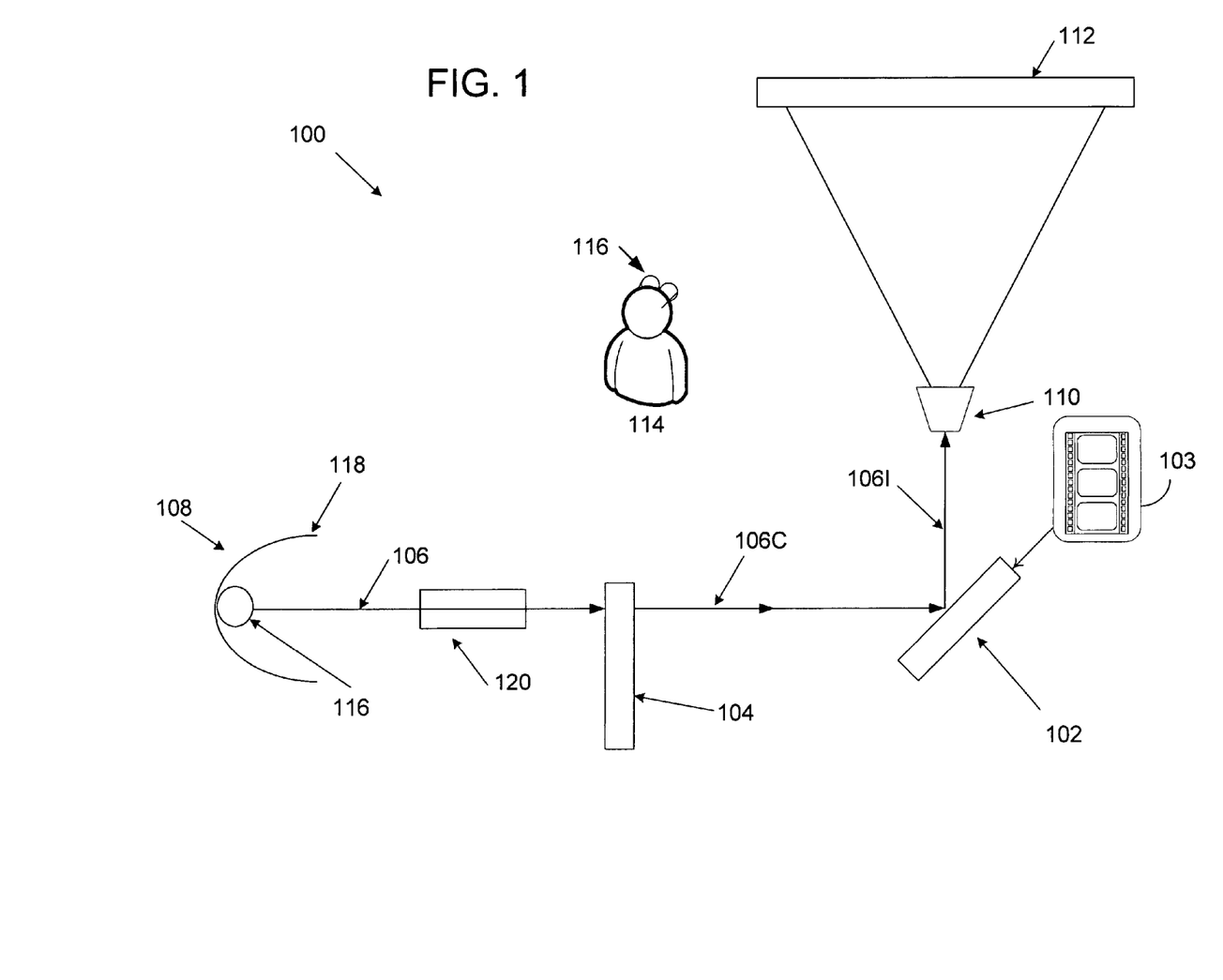
FIGS. 1 and 3 are block diagrams of a projector.

In a typical digital projection system, for example system 100 in FIG. 1, a full-color image is created by generating three single-color component images that are simultaneously or sequentially projected to resolve into a single, full-color image when viewed by the audience. A single imaging device 102, produces the component images based on an incoming video stream 103 using light received from a color wheel 104 that rotates red, green, and blue filters into the path of light 106 projected from a spread-spectrum (white) light source 108, producing colored light 106C. In some examples, the light sources include a bulb 116, a reflector 118, and a homogenizing device 120. The homogenizing device 120, for example, a light pipe, makes sure that the light reaching the color wheel 104 is uniform in brightness and color. The imaging device 102 could be a reflective device, such as a DLP light valve, or a transmissive device, such as an LCD panel (with appropriate changes to the layout of the projection system 100).

The filtered and imaged light 106I is then focused by a lens 110 onto a projection screen 112, to be seen by a viewer 114. As long as the imaging source 102 and color wheel 104 switch between component images and colors at the proper rate, the viewer 114 will perceive a single, full-color image. For example, to produce a full color image at 30 frames per second (fps), the imaging device must produce at least 90 single-color frames per second. The actual rate will depend on the frame-rate of the source material, the number of color segments in the wheel 104, and the rate at which the wheel spins. For example, some projectors have more than three segments and spin the wheel 2, 4, or 8 times faster than the minimum needed, according to the number of segments. In some examples, three separate colored light sources are used or three imaging devices are used, one for each color. Each of these approaches can be combined with the others in various ways, for example, to project all three color components simultaneously.

Figure 2A:
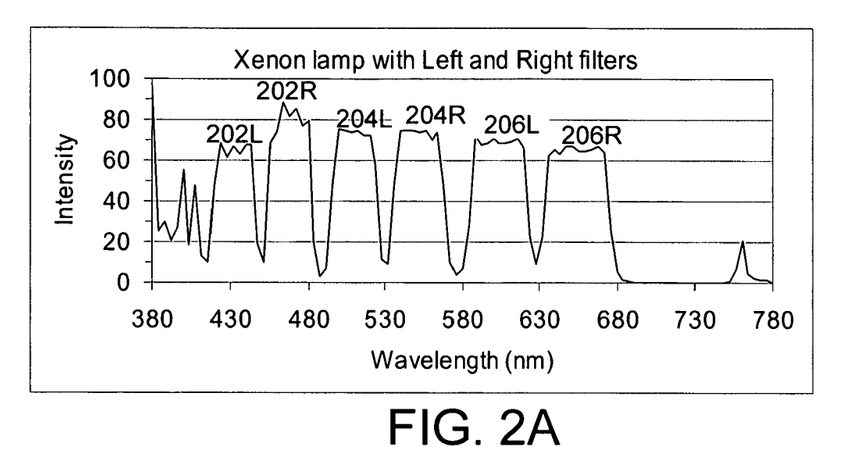
FIGS. 2A-2G and 5A-B are spectral graphs.
Figure 2B:
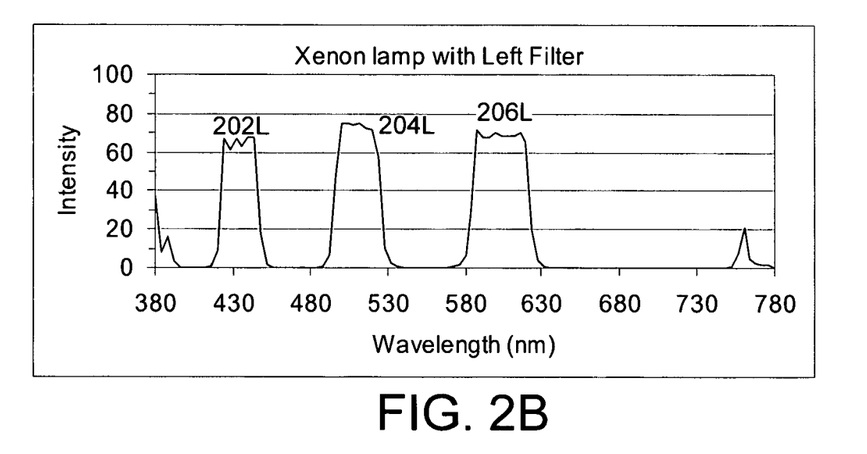
Figure 2C:
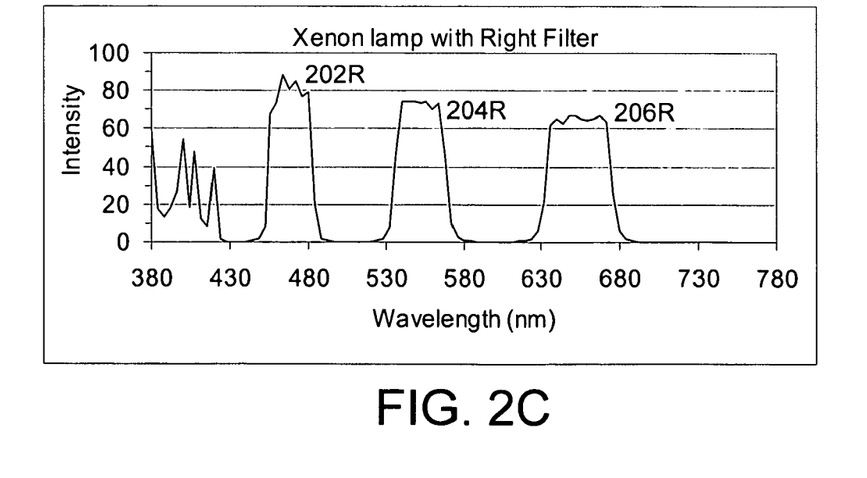
Figure 2D:
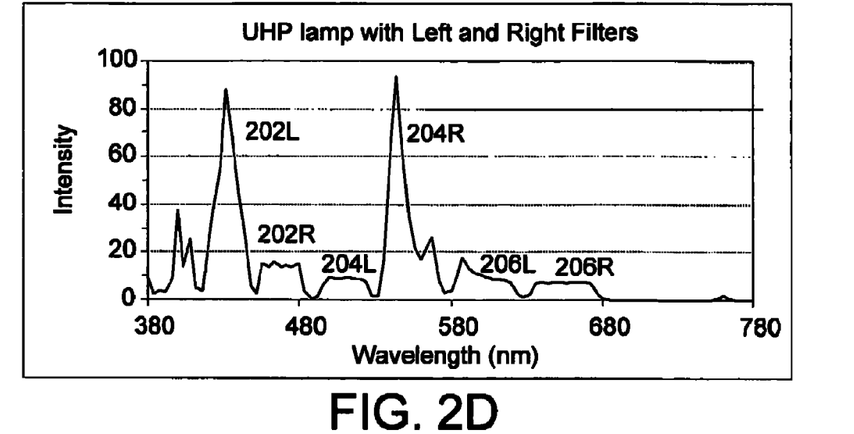
Figure 2E:
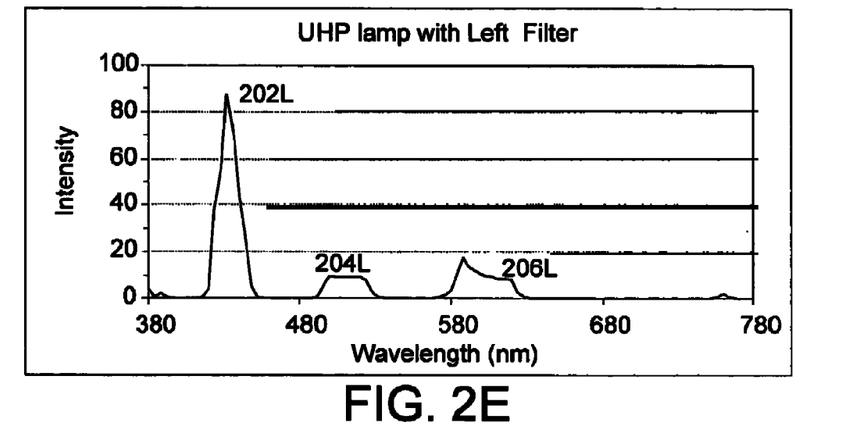
Figure 2F:
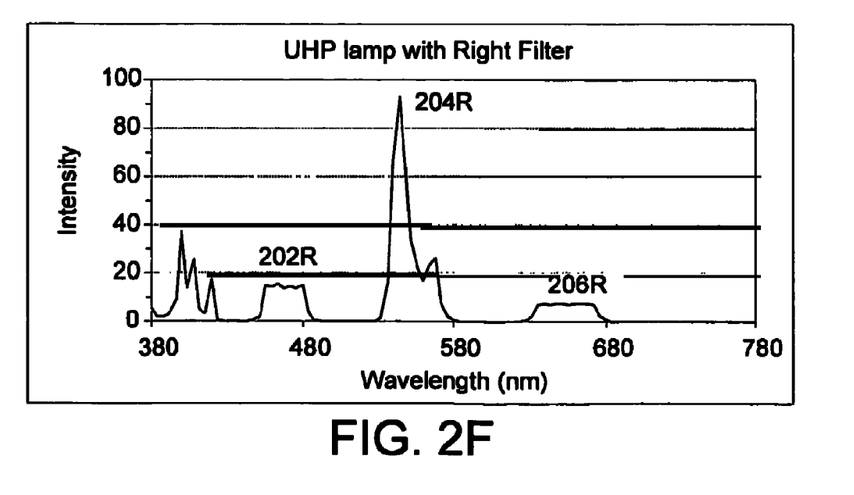
Figure 2G:
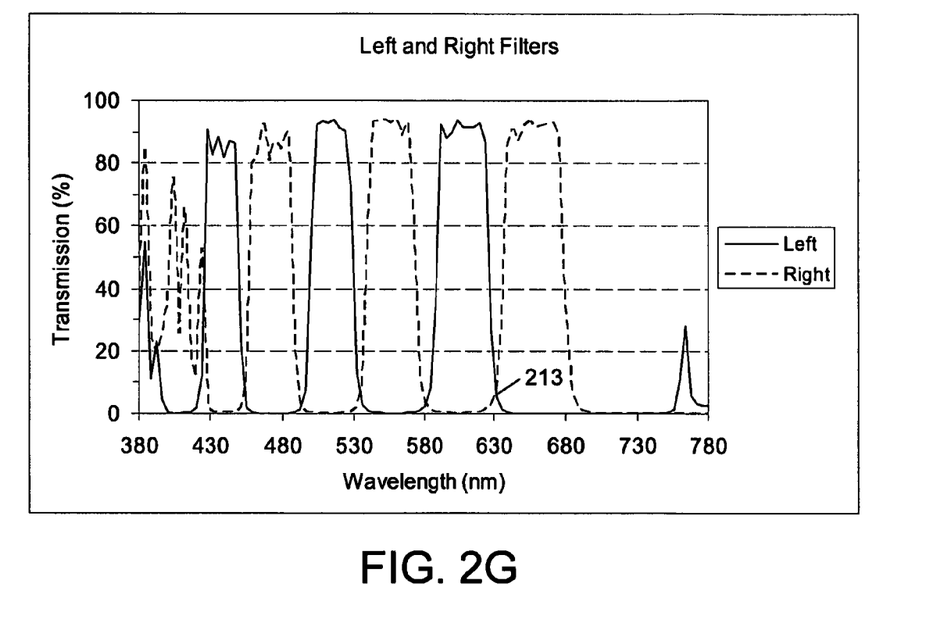

A type of 3D projection is described, for example, in U.S. Pat. No. 6,283,597. Rather than polarize the images for each eye or shift each into a completely different color, the individual red, green, and blue components of each left- and right-eye image are constrained to a narrow band of that color, different for each eye, such that filters can be used to allow only the correct image to reach each eye while still allowing each eye's image to be composed of all three colors. FIGS. 2A and 2D show example sets of filtered color bands for two commonly used light sources. Xenon lamps are commonly used in cinema projection, while UHP (ultra high performance) mercury arc lamps are commonly used in home projectors. Images for the left eye are filtered inside the projector into bands 202L, 204L, and 206L, shown separately in FIGS. 2B and 2E, while images for the right eye are filtered inside the projector into bands 202R, 204R, and 206R, shown separately in FIGS. 2C and 2F. In each graph, the intensity values are normalized to 100 representing the potential intensity of unfiltered light. The transmission rates of the filters, independent of light source, are shown in FIG. 2G. Filters in the viewer's glasses transmit the appropriate bands for each eye, while blocking the bands used for the other eye. For good image separation, the bands for the left and right eye should not overlap, meaning that the bands do not have any wavelengths in common above approximately five percent of peak intensity, e.g., above point 213 in FIG. 2G.

For this type of projection, a similar projection system to that shown in FIG. 1 can be used. Instead of the color filter wheel 104 having three colors, it has six, corresponding to the six bands 202L, 204L, 206L, 202R, 204R, and 206R. Alternatively, the three-color wheel can still be used, with a second filter or set of filters used to split each color into the two appropriate bands. In such a system, the image source produces six images per frame, i.e., red, blue, and green components for each eye. The viewer 114 wears glasses 116 with filters that allow each eye to see the three bands used for the corresponding image. Such a system has advantages of providing a full-color stereoscopic image over a wider viewing angle than systems using polarized light.

Figure 3:
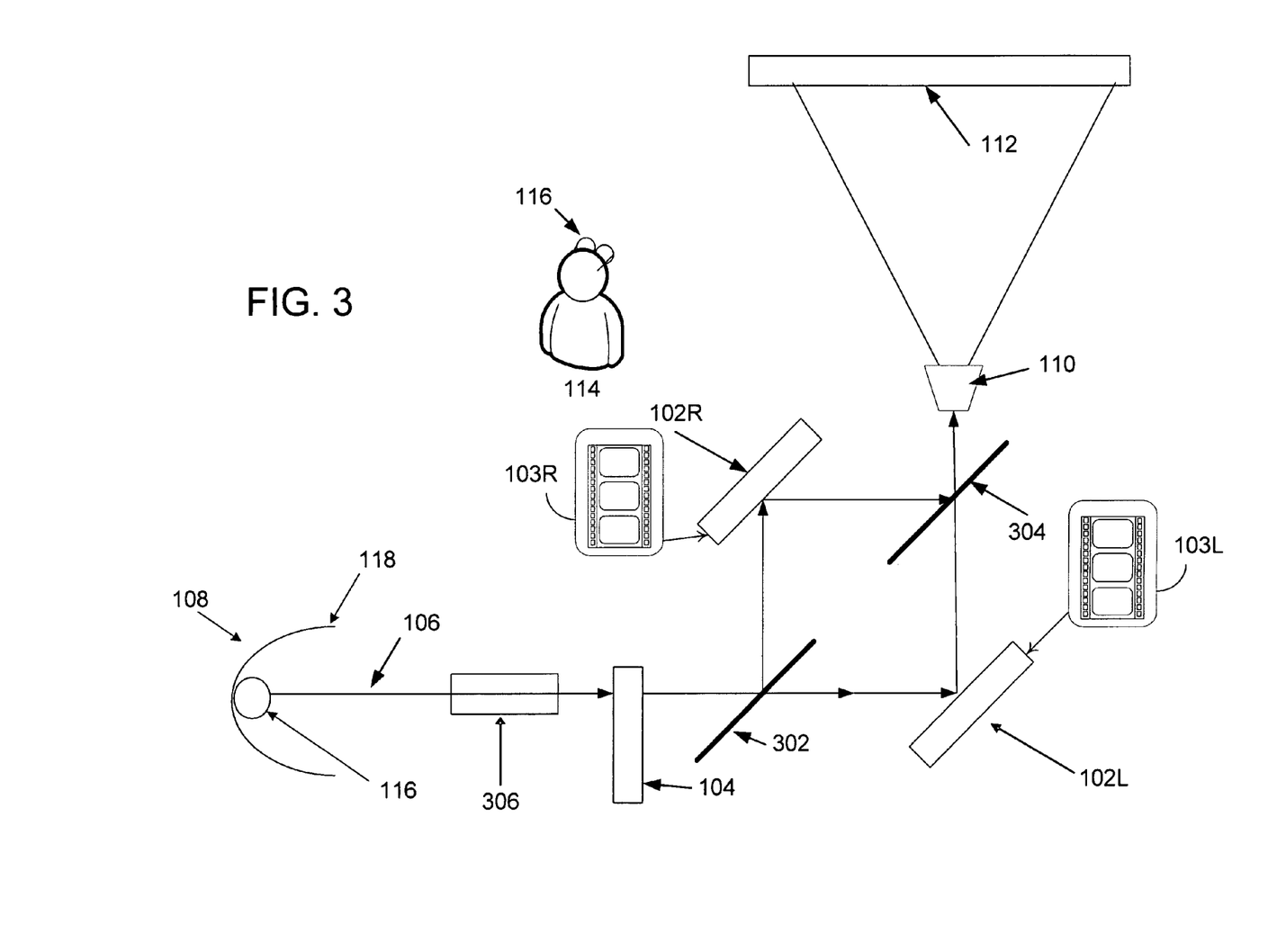
Figure 4:
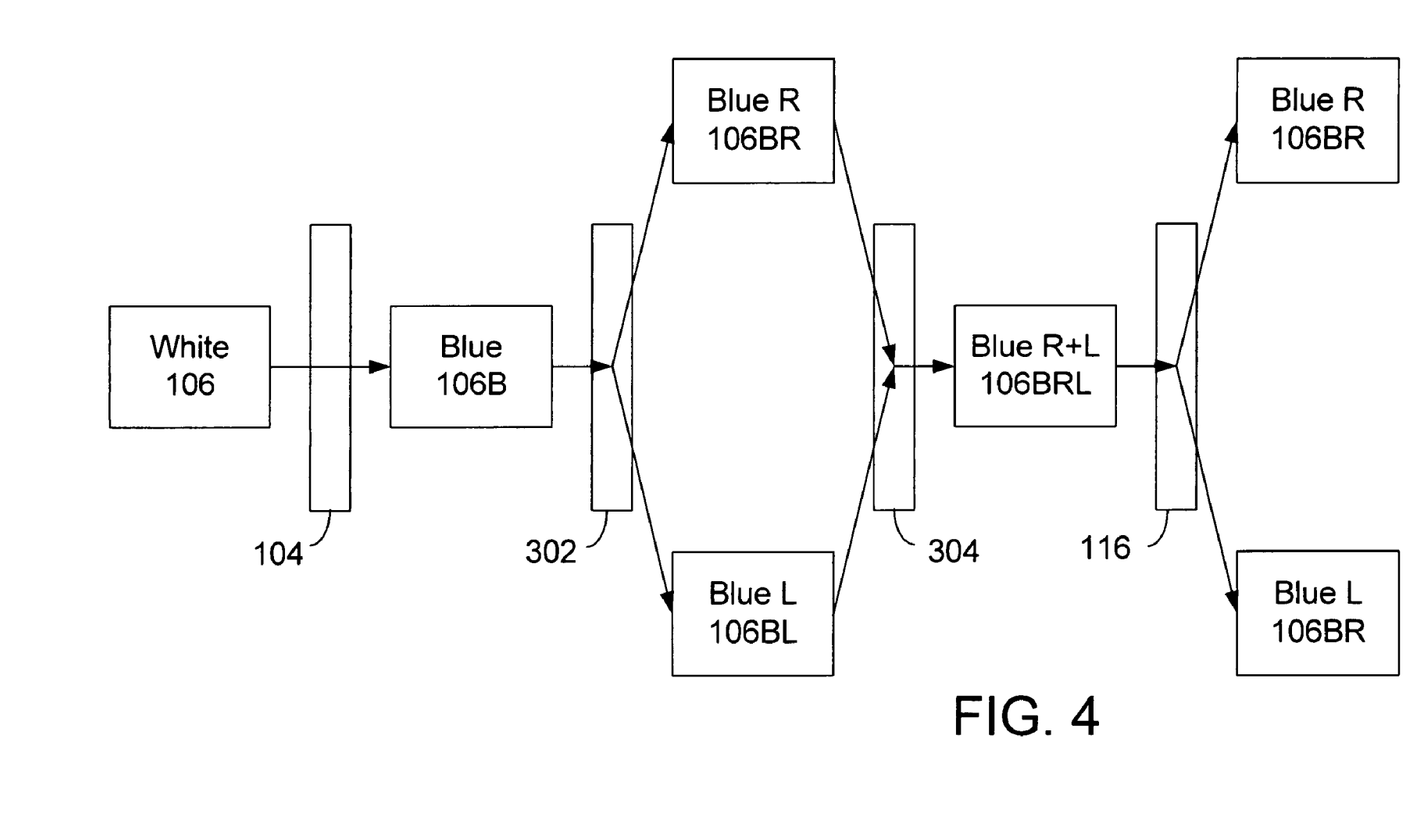
FIGS. 4 and 6A-C are flow charts describing image adjustment methods.

In some examples, as shown in FIGS. 3 and 4, two imaging sources 102R, 102L are used with two image streams 103R, 103L, one for each eye. A three-band spectral filter 302 is configured to transmit the three bands corresponding to the left eye and reflect all other light, including the three color bands corresponding to the right eye. Each of the imaging sources 102R, 102L produces the three component-color images for the corresponding eye, synchronized with the color filter wheel 104, which filters incoming white light into a wide band for each color, encompassing both bands used for the right and left eye. A second three-band spectral filter 304 again transmits the bands for the left eye and reflects the rest, re-aligning the images from the two imaging sources before they reach the projection lens 110. The extra light (outside the desired color band) in the right-eye image may cause ghosting in the perceived image, but can be filtered out by placing an additional filter in the path of the light immediately before or after imaging source 102R to block light outside the right-eye bands. Three-band spectral filters 302 and 304 can be identical. An example of a design for such filters is given in a co-pending patent application Forming Spectral Filters of Barret Lippey et al, filed on the same day as this application and incorporated here by reference. This arrangement allows each imaging device to image only three images per frame, rather than six. FIG. 4 abstractly shows the flow of light for one color. White light 106 is filtered into blue light 106B by color wheel 104. Blue light 106B is split into a right-eye band 106BR and a left-eye band 106BL by three-band spectral filter 302. After being imaged, the right-eye and left-eye bands 106BR, 106BL are merged to formed combined light 106BRL by three-band spectral filter 304 and projected. Filters in glasses 116 re-separate the combined light 106BRL back into right-eye and left-eye bands 106BR, 106BL.

The system of FIG. 3 can be easily adapted to also project two-dimensional (that is, not stereoscopic) images. By putting the same image on both imaging sources, rather than a right-eye and left-eye image, both bands for each color will show the same image, and a single image will be projected. Unlike the 3D case, where no great degradation of the picture results if the images are not perfectly aligned, it is necessary when projecting two identical images in the 2D case to assure they are aligned within approximately 1 or 2 pixels accuracy. This is relatively easy in the example of FIG. 3, since the two imaging devices 102R, 102L are in a single assembly and use a single projecting lens 110. The imaging devices 102R, 102L can be aligned at the factory, and no further adjustment should be necessary when the projector is installed.

In some examples, when projecting a 2D image, the images produced by the two imaging sources can be manipulated to adjust the white point of the resulting image so that it is different than the white point when projecting a 3D image. Adjusting the color point of a projected image is accomplished by decreasing the intensity of the image projected in certain frequency ranges, giving up brightness in exchange for better color accuracy. In a 3D mode, because the viewer is wearing filters in the 3D glasses, each eye is receiving only half the projected light, decreasing the brightness of the perceived image, as compared to the image viewed without the glasses. Any adjustment to the images that would change too far from the native colors could decrease the brightness below acceptable levels, so the trade-off is made in favor of brightness over color accuracy.

In a 2D mode, the viewer doesn't need the 3D glasses, and each eye can receive the full brightness of the projected image. The white point can be manipulated more during 2D projection without degrading the viewer's experience, as a larger decrease in brightness is possible without going below acceptable levels. For typical theater viewing conditions, a minimum brightness of approximately 12 foot-Lamberts has been established in the cinema industry. As long as the brightness does not drop significantly below that level, the iris of the human eye can make up for reduced brightness. Other attributes of the image can be adjusted in this way as well, for example, gamma, contrast, and brightness, e.g., to compensate for perceived differences in brightness between 2D and 3D projections.

Figure 5A:
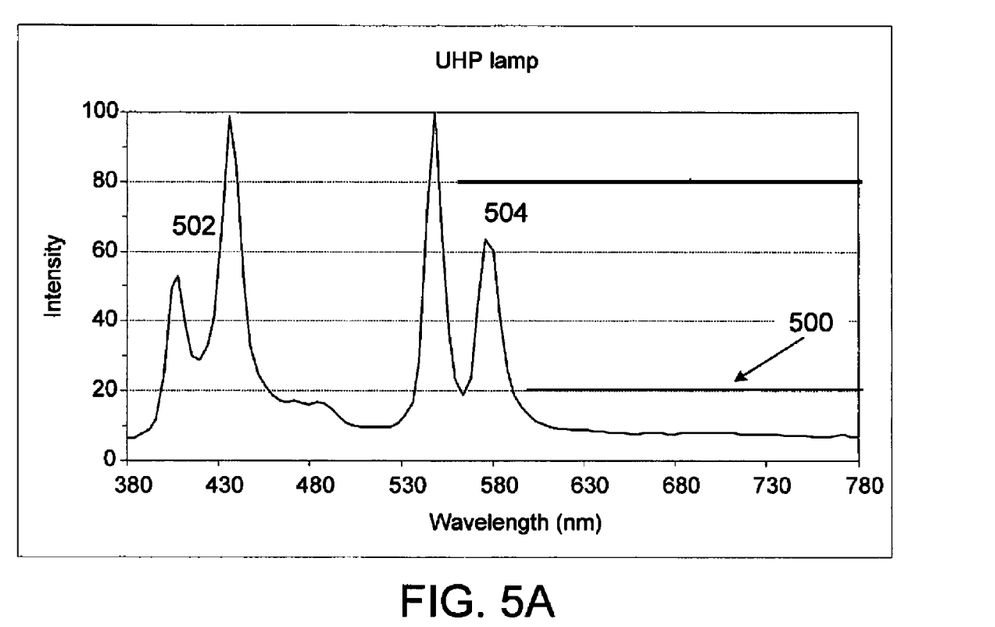
Figure 5B:
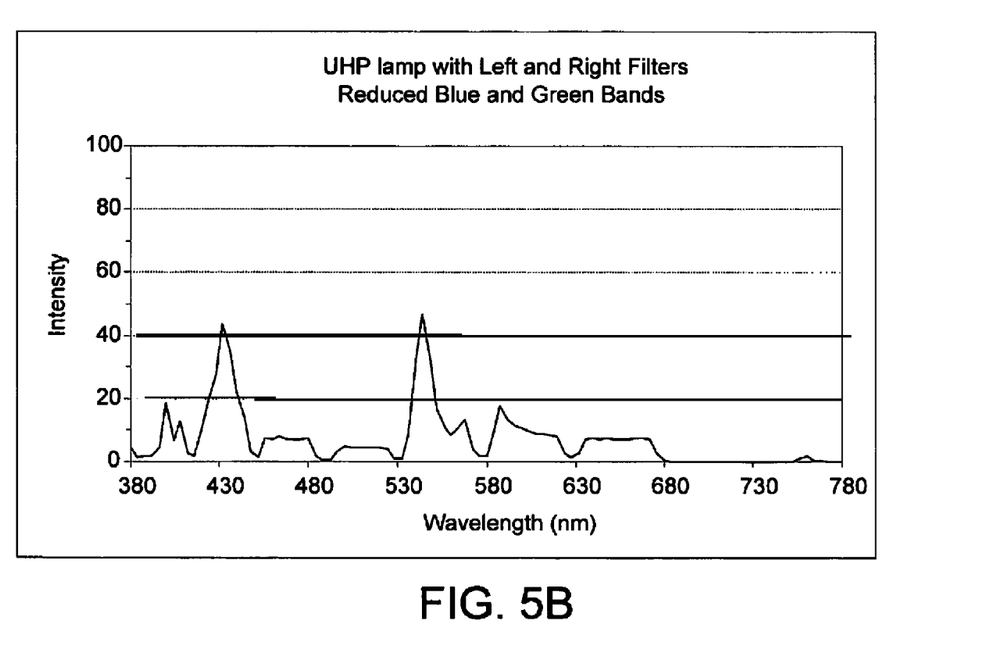

This can be used to improve the color of the projected 2D image. For example, as shown in FIG. 5A, a UHP lamp has a spectrum 500 with a few peaks 502, 504 in the blue and green bands. Without adjustment, the light composed of all six bands (FIG. 2D) passed by the filters has a white point of x=0.266, y=0.312. Decreasing the contribution of the blue and green bands by decreasing the brightness of the blue and green component images by 50% in the left and right imaging devices, as shown in FIG. 5B, shifts the white point to x=0.307, y=0.319, which is a much more desirable color of white than the uncorrected color of FIG. 5A. Similar adjustments can be made for other bulbs or other targeted white points and chromaticities.

In some examples, a digital signal processor determines what adjustment is needed to the source image to produce the desired color point, and it adjusts the image data sent to the two imaging devices accordingly. The digital signal processor may be configured to manipulate the right-eye and left-eye components of a 3D image to keep the brightness high, while manipulating the components of a 2D image to get the specific color point desired at the expense of brightness. The processor may analyze the image streams to determine whether the projection is 2D or 3D, or it may have a specific input with that information. That input could be manual or could be data included with the image streams. The processor can also take into account the effect of the filters worn by the viewer during a 3D projection on the perceived color point. For example, the perceived color point may be different from the projected color point when 3D glasses are used, because each eye is provided with different information, and a system as described may compensate for this. The filters described in the co-pending application cited earlier happen to provide the same perceived white point in both 2D and 3D modes when the projection is done with a Xenon lamp, which has a relatively flat color spectrum, but provide different perceived white points between 2D and 3D modes with a UHP lamp, as described above. To avoid shifting the white point of a Xenon lamp, the filters provide very narrow gaps between the bands, for example, gaps of no more than 30 nm of wavelength at full-width half-maximum. In some useful examples, the difference in white point location for unfiltered light and the filtered light should be less than 0.005 in x and less than 0.005 in y.

In some examples, the color adjustments are computed as follows. A computational approach is used to map the R', G' and B' brightness levels of individual pixels in the encoded video streams to the necessary R*, G* and B* signal levels used to drive a projector with primary chromaticities that differ from the encoded video stream chromaticities. The system is described assuming a numeric representation of the RGB levels, but an equivalent processing structure could be implemented in an analog signal processor. The notations used are shown in table 1.

TABLE 1

| | |
|---|---|
| R', G', B' | Normalized (0 to 1) non-linearly encoded (gamma) RGB levels of encoded video stream |
| R, G, B | Normalized (0 to 1) linear levels of RGB levels of encoded video stream |
| $X_e, Y_e, Z_e$ | Tristimulus values of the encoded stream pixels |
| R*, G*, B* | Normalized (0 to 1) non-linearly encoded RGB drive levels to imaging device |
| $R^\dagger, G^\dagger, B^\dagger$ | Normalized (0 to 10) linear drive levels using projector chromaticities |
| $X_d, Y_d, Z_d$ | Tristimulus values of the imaging device while being driven with specific R*, G*, B* levels |

Using the notation described in table 1, the digital signal processor takes the R'G'B' levels of each image pixel and computes the appropriate R*G*B* levels to be sent to the imaging device. One goal is for the displayed tristimulus values $X_d, Y_d, Z_d$, to match the encoded tristimulus values $X_e$, $Y_e, Z_e$, where possible.

The first processing step is to calculate the tristimulus levels associated with the encoded video stream R'G'B'. To compute the tristimulus levels, the non-linear encoding of the R'G'B' levels must be inverted to yield the linear RGB levels. That non-linear mapping is defined as part of the video standard used to create the R'G'B' signal.

Figure 6A:
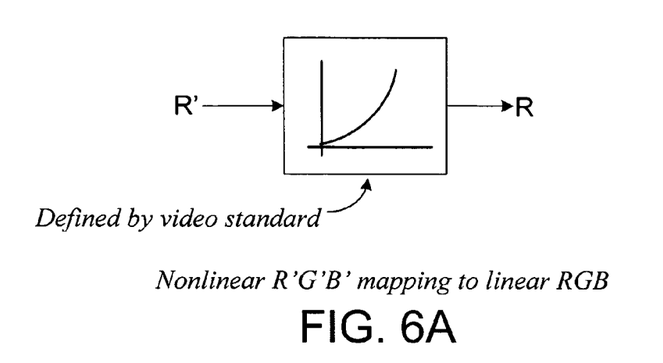

A typical power function like R' to R mapping is shown in FIG. 6A. Identical mapping functions would be used for G' and B' channels. Using the linear RGB levels, the tristimulus values for the encoded pixel can be calculated as follows. The initial encoding is defined by Eq. 1, $$\begin{bmatrix} X_e \\ Y_e \\ Z_e \end{bmatrix} = \begin{bmatrix} X_{red,encode} & Y_{red,encode} & Z_{red,encode} \\ X_{green,encode} & Y_{green,encode} & Z_{green,encode} \\ X_{blue,encode} & Y_{blue,encode} & Z_{blue,encode} \end{bmatrix} \begin{bmatrix} R \\ G \\ B \end{bmatrix} \quad (1)$$

where $X_{red,encode}$, $Y_{red,encode}$ and $Z_{red,encode}$ are the tristimulus coefficients associated with the red primary as defined in the video encoding standard. The other lines in the matrix of Eq. 1 correspond to the green and blue primaries defined by the video encoding standard.

Since the goal is to match the chromaticities of the projected image to the encoded chromaticities, the identity of Eq. 2 is established:

$$\begin{bmatrix} X_d \\ Y_d \\ Z_d \end{bmatrix} = \begin{bmatrix} X_e \\ Y_e \\ Z_e \end{bmatrix} \quad (2)$$

A similar matrix operation to Eq. 1 is performed to map the tristimulus values into the linear $R^\dagger G^\dagger B^\dagger$ levels associated with the display, as shown in Eq. 3, $$\begin{bmatrix} R^\dagger \\ G^\dagger \\ B^\dagger \end{bmatrix} = \begin{bmatrix} X_{red,display} & Y_{red,display} & Z_{red,display} \\ X_{green,display} & Y_{green,display} & Z_{green,display} \\ X_{blue,display} & Y_{blue,display} & Z_{blue,display} \end{bmatrix}^{-1} \begin{bmatrix} X_e \\ Y_e \\ Z_e \end{bmatrix} \quad (3)$$

where $X_{red,display}$, $Y_{red,display}$ and $Z_{red,display}$ are the tristimulus values of the red channel primary of the projector. The other lines in the matrix correspond to the green and blue channel primaries of the projector.

Figure 6B:
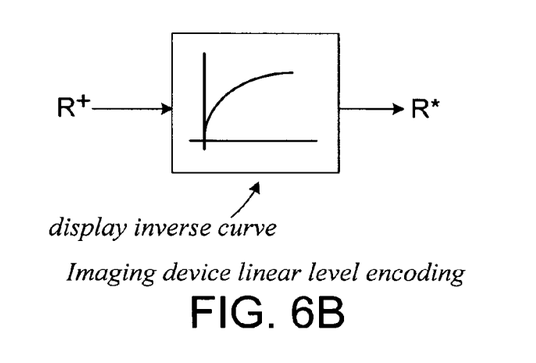
Figure 6C:
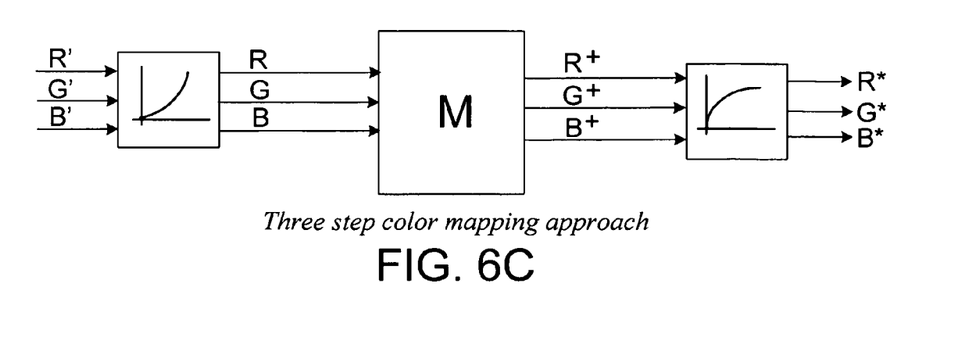

The linear $R^\dagger G^\dagger B^\dagger$ levels are next mapped back into the encoded format that is associated with the imaging device. Showing only the red channel, a schematic process for this step is shown in FIG. 6B. It should be noted that the two matrix operations of Eqs. 1 and 3 can be pre-multiplied to form a single operation $$\begin{bmatrix} R^\dagger \\ G^\dagger \\ B^\dagger \end{bmatrix} = M \begin{bmatrix} R \\ G \\ B \end{bmatrix} \quad (4)$$

where $$M = \begin{bmatrix} X_{red,display} & Y_{red,display} & Z_{red,display} \\ X_{green,display} & Y_{green,display} & Z_{green,display} \\ X_{blue,display} & Y_{blue,display} & Z_{blue,display} \end{bmatrix}^{-1} \begin{bmatrix} X_{red,encode} & Y_{red,encode} & Z_{red,encode} \\ X_{green,encode} & Y_{green,encode} & Z_{green,encode} \\ X_{blue,encode} & Y_{blue,encode} & Z_{blue,encode} \end{bmatrix} \quad (5)$$

so that the tristimulus values need not be computed explicitly. The 3 processing steps required are shown schematically in FIG. 6C.

All of these adjustments, the color point correction and the right/left color bands, can be done to images at the point of projection, so that the source images do not have to be modified in any way to be used in such a system. Images originally intended for projection with a polarization-based 3D projection system can be used unmodified in the system described. If the images are produced with knowledge of the projection technology to be used, further enhancements could be achieved, for example, selecting the colors of the objects to be filmed to take advantage of the improved color definition of the six-color based projection system, or manipulating the colors in the images to create unnatural depth effects when projected and viewed. For the system described above, there will be two different M matrices, one for 2D projection and one for 3D, and they will be switched when the mode is switched. In 3D projection, the matrix coefficients account for the projection system, as described, as well as the three-band filters used in the projector and glasses, and the possible perceptual shifts that occur when different color information is presented to each eye.

Other implementations are within the scope of the claims. For example, the white source light could be split into two beams before being filtered, and transmissively filtered for both sets of color bands. The projection screen can be flat, curved, or domed. Using color-filter-based 3D projection is advantageous because the image separation remains the same over the entire screen, unlike polarization, which may vary.

What is claimed is:

1. An apparatus comprising a processor
   to adjust a first image generated by a projector and a second image generated by the projector in a first manner to provide a first processed first image and a first processed second image for projecting on a projection screen if the first and second images together comprise a stereoscopic image; and
   to adjust the first image and the second image in a second manner to provide a second processed first image and a second processed second image for projecting on a projection screen if the first and second images do not comprise a stereoscopic image.

2. The apparatus of claim 1 in which the first image comprises light having a first set of multiple wavelength bands and the second image comprises light having a second set of multiple wavelength bands, the first and second sets of multiple wavelength bands not overlapping above 20% of peak intensity.

3. The apparatus of claim 2 in which the first and second sets of multiple wavelength bands do not overlap above 5% of peak intensity.

4. The apparatus of claim 2 in which adjusting the images comprises controlling an image attribute by adjusting brightness of subsets of the first and second sets of wavelength bands.

5. The apparatus of claim 2 in which the first set of wavelength bands comprises
   a band of wavelengths having a center wavelength around 435 nm,
   a band of wavelengths having a center wavelength around 510 nm, and
   a band of wavelengths having a center wavelength around 610 nm.

6. The apparatus of claim 2 in which the second set of wavelength bands comprises
   a band of wavelengths having a center wavelength around 475 nm,
   a band of wavelengths having a center wavelength around 550 nm, and
   a band of wavelengths having a center wavelength around 660 nm.

7. The apparatus of claim 4 in which controlling the image attribute comprises controlling a white point of a composite image formed from the first image and the second image.

8. The apparatus of claim 4 in which controlling the image attribute comprises controlling a gamma value of a composite image formed from the first image and the second image.

9. The apparatus of claim 4 in which controlling the image attribute comprises controlling a contrast value of a composite image formed from the first image and the second image.

10. The apparatus of claim 4 in which controlling the image attribute comprises controlling a brightness value of a composite image formed from the first image and the second image.

11. The apparatus of claim 1 in which adjusting the first and second image in the first manner comprises changing brightness of the first and second images by equal amounts.

12. The apparatus of claim 1 in which adjusting the first and second image in the second manner comprises changing brightness of the first and second images by different amounts.

13. The apparatus of claim 1 in which the processor is configured to adjust the images to control an image attribute of the projected light.

14. A projector comprising
a first image source to generate images in light having a first set of multiple wavelength bands,
a second image source to generate images in light having a second set of multiple wavelength bands, and
a processor
to adjust a first image generated by the first image source and a second image generated by the second image source in a first manner to provide a first processed first image and a first processed second image for projecting on a projection screen if the first and second images together comprise a stereoscopic image; and
to adjust the first image and the second image in a second manner to provide a second processed first image and a second processed second image for projecting on a projection screen if the first and second images do not comprise a stereoscopic image.

15. A method comprising generating a first series of images in a first set of wavelengths and a second series of images in a second set of wavelengths, and
if the first and second images comprise a stereoscopic image, adjusting the images in a first manner to provide a first processed first image and a first processed second image for projecting on a projection screen, and
if the first and second images do not comprise a stereoscopic image, adjusting the images in a second manner to provide a second processed first image and a second processed second image for projecting on a projection screen.

16. The method of claim 15 also comprising determining whether the first and second images comprise a stereoscopic image by receiving an input from an external source of information.

17. The method of claim 16 in which the external source of information is a person.

18. The method of claim 16 in which the external source of information is a source of the images.

19. The method of claim 15 also comprising determining whether the first and second images comprise a stereoscopic image by comparing the first and second images, and determining that they comprise a stereoscopic image if they are different, and determining that they do not comprise a stereoscopic image if they are the same.

20. The method of claim 15 in which adjusting the first and second image in the first manner comprises changing brightness of the first and second images by different amounts.

21. The method of claim 15 in which adjusting the first and second image in the second manner comprises changing brightness of the first and second images by equal amounts.

22. An apparatus comprising
a light source,
a first color filter to transmit light in a first three bands of wavelengths and reflect light in other wavelengths,
a second color filter to transmit light in a second three bands of wavelengths and reflect light in other wavelengths,
a first reflective imaging source to impart an image to light transmitted by the first color filter and direct the light to the second color filter,
a second reflective imaging source to impart an image into light reflected by the first color filter and direct the light to the second color filter, and
a lens to focus light from the second color filter onto a viewing screen in which the first and second three bands of wavelengths are the same.

* * * * *